(12) United States Patent
Yokota et al.

(10) Patent No.: US 9,573,232 B2
(45) Date of Patent: Feb. 21, 2017

(54) ACTUATOR AND CLAMP DEVICE USING SAME

(75) Inventors: Hideaki Yokota, Kobe (JP); Keitaro Yonezawa, Kobe (JP)

(73) Assignee: KOSMEK LTD., Kobe-Shi, Hyogo (JP)

( * ) Notice: Subject to any disclaimer, the term of this patent is extended or adjusted under 35 U.S.C. 154(b) by 56 days.

(21) Appl. No.: 14/237,410

(22) PCT Filed: Mar. 26, 2012

(86) PCT No.: PCT/JP2012/002076
§ 371 (c)(1),
(2), (4) Date: Feb. 6, 2014

(87) PCT Pub. No.: WO2013/021520
PCT Pub. Date: Feb. 14, 2013

(65) Prior Publication Data
US 2014/0191456 A1    Jul. 10, 2014

(30) Foreign Application Priority Data
Aug. 8, 2011  (JP) .................................. 2011-173116

(51) Int. Cl.
*B23Q 3/08* (2006.01)
*B23Q 3/06* (2006.01)
(Continued)

(52) U.S. Cl.
CPC . *B23Q 3/06* (2013.01); *B25B 5/04* (2013.01); *B25B 5/06* (2013.01); *B25B 5/061* (2013.01);
(Continued)

(58) Field of Classification Search
USPC .......................................................... 269/25
See application file for complete search history.

(56) References Cited

U.S. PATENT DOCUMENTS 2,876,746 A * 3/1959 Storrs ...................... B23Q 3/08
                                                      92/132
2,990,813 A * 7/1961 Barrett ................ F15B 15/1409
                                                      254/10 C
(Continued)

FOREIGN PATENT DOCUMENTS

EP       1595640 A1    11/2005
FR       2654664 A1 *  5/1991 ............. A63C 11/26
(Continued)

OTHER PUBLICATIONS

International Search Report dated Jun. 26, 2012, for PCT/JP2012/002076.
European Search Report dated Sep. 4, 2015, for EP 12822716.2.

*Primary Examiner* — Alvin Grant
(74) *Attorney, Agent, or Firm* — Bacon & Thomas, PLLC (57) ABSTRACT

A first piston for high load is inserted into a housing so as to be movable vertically, and a second piston for low load is inserted into a cylindrical hole of the first piston so as to be movable vertically. An output portion projects from the second piston to above the housing. A first spring for high load and a second spring for low load are mounted in a spring chamber defined by both pistons and. Both springs and are mounted so as to urge the first piston and the second piston upward. A switching mechanism disposed in the pressure fluid chamber at a side opposite to the spring chamber, connects the first piston selectively to the housing or the second piston.

7 Claims, 5 Drawing Sheets

(51) Int. Cl.
*B25B 5/04* (2006.01)
*B25B 5/06* (2006.01)
*F15B 15/14* (2006.01)
*F15B 15/20* (2006.01)

(52) U.S. Cl.
CPC ........... *B25B 5/062* (2013.01); *F15B 15/1409* (2013.01); *F15B 15/1447* (2013.01); *F15B 15/204* (2013.01)

(56) References Cited

U.S. PATENT DOCUMENTS

| | | | | |
|---|---|---|---|---|
| 3,581,625 | A | * | 6/1971 | Michalak ............... F15B 15/261 91/45 |
| 3,943,830 | A | | 3/1976 | Sugiura |
| 4,628,586 | A | * | 12/1986 | Yoshimi ................ B23B 31/263 409/233 |
| 5,628,477 | A | * | 5/1997 | Caferro .................... B64C 9/02 244/195 |
| 8,746,664 | B2 | * | 6/2014 | Rentz ...................... B25B 5/122 269/20 |

FOREIGN PATENT DOCUMENTS

| | | | | |
|---|---|---|---|---|
| JP | 49-129072 A | | 12/1974 | |
| JP | EP 0913587 A2 | * | 5/1999 | ............... B25B 5/06 |
| JP | 11-170133 A | | 6/1999 | |
| JP | WO 2004065060 A1 | * | 8/2004 | ............... B25B 5/06 |

* cited by examiner

ACTUATOR AND CLAMP DEVICE USING SAME

TECHNICAL FIELD

The invention relates to a spring-driven pressure fluid return type actuator and a clamp device using the actuator.

BACKGROUND ART

As such a type of conventional actuator, there is an actuator disclosed in Japanese Patent Application Laid-Open Publication No. 11-170133. The conventional art shown in FIGS. 1 to 4 thereof is configured as follows.

A second piston for low load is inserted into a cylindrical hole of a first piston for high load which is inserted into a housing, and an output portion projects from the second piston to above the housing. A pressure fluid chamber is formed between an upper end wall of the housing and the first piston and the second piston. In addition, a first spring for high load is mounted between a lower end wall of the housing and the first piston, and a second spring for low load is mounted between a lower portion of the first piston and the second piston. Furthermore, a ball-type switching mechanism is disposed within a lower portion of the housing. The switching mechanism is configured to connect the first piston selectively to the lower end wall of the housing or the second piston.

The foregoing describes Japanese Patent Application Laid-Open Publication No. 11-170133

In the above-described conventional art, when a pressure oil supplied into the pressure fluid chamber retracts the first piston and the second piston downward, engagement balls of the switching mechanism connect the first piston to the housing to block the first piston from moving upward. On the other hand, when the pressure oil is discharged and the second spring advances the second piston upward by a predetermined stroke, the engagement balls connect the first piston to the second piston, whereby the urging force of the first spring is applied to the second piston via the first piston and the engagement balls.

However, since the second spring is mounted between the first piston and the second piston as described above, after the first piston and the second piston are connected and integrated with each other by the engagement balls, the urging force applied from the second spring to the second piston is received by the first piston, and thus only the urging force of the first spring advances the second piston upward. Therefore, there is room for improvement in increasing a force of advancing the second piston.

An object of the present invention is to allow a force of advancing a second piston to be greater than that in the conventional art.

SUMMARY OF THE INVENTION

In order to attain the above object, according to the present invention, an actuator 10 is configured as follows, for example, as shown in FIGS. 1 to 4 or FIGS. 5A to 5D.

Specifically, a first piston 20 for high load is inserted into a housing 18 so as to be movable in a direction of an axis CL. A cylindrical hole 40 extends through the first piston 20 in the direction of the axis CL, a second piston 22 is movably inserted into the cylindrical hole 40, and a leading end portion of the second piston 22 is formed as an output portion 22b projecting to an outside of the housing 18. An inside of the housing 18 is partitioned by the first piston 20 and the second piston 22 to form a pressure fluid chamber 46 and a spring chamber 44. A first spring 24 for high load is mounted so as to be received by a wall surface of the spring chamber 44 and urges the first piston 20 toward the pressure fluid chamber 46 side. A lower end 26a of a second spring 26 for low load is mounted so as to be received by a lower end wall 18a of the housing 18 and the second spring 26 urges the second piston 22 toward the pressure fluid chamber 46 side. A switching mechanism 27 is configured to have a plurality of engagement members 50 arranged along an outer periphery of the second piston 22 and is disposed in the pressure fluid chamber 46 and connects the first piston 20 selectively to the housing 18 or the second piston 22 via the engagement members 50. The switching mechanism 27 is configured such that the first piston 20 is connected to the second piston 22 via the engagement members 50 and the connection between the first piston 20 and the housing 18 is releasable to allow the first piston 20 to move in the direction of the axis CL relative to the housing 18 when the second spring 26 advances the second piston 22 toward the pressure fluid chamber 46 side by a predetermined stroke in a state where the first piston 20 is connected so as to be received by the housing 18 via the engagement members 50, during an actuator operating period when a pressure fluid L in the pressure fluid chamber 46 is discharged.

The present invention exerts the following advantageous effects.

In the present invention, the second spring is mounted between an inner wall of the housing and the second piston. Thus, even after the first piston and the second piston are connected and integrated with each other by the switching mechanism, the urging force of the second spring advances the second piston toward the pressure fluid chamber side. As a result, it is possible to advance the second piston by not only the urging force of the first spring but also the urging force of the second spring, and a force of advancing the second piston can be increased.

Meanwhile, in the above-described conventional art (Patent Literature 1), since the engagement ball type switching mechanism is disposed outside the pressure fluid chamber (hydraulic chamber) and in the lower portion of the housing, it is required to periodically inject a lubricant such as grease. Thus, there is a problem that maintenance of the switching mechanism is troublesome.

In contrast, in the present invention, the switching mechanism 27 is disposed in the pressure fluid chamber 46. Thus, when a pressure oil (or compressed air containing a lubricating oil) is used as a pressure fluid, it is possible to sufficiently lubricate the switching mechanism 27 by the pressure oil (or the compressed air containing the lubricating oil). As a result, it is possible to smoothly use the switching mechanism 27 over a long period of time, and maintenance thereof is not troublesome.

In the present invention, it is preferred that the switching mechanism 27 is configured as follows.

Specifically, a plurality of engagement members 50 are arranged along an outer periphery of the second piston 22 so as to be spaced apart from each other at predetermined intervals in a circumferential direction. An outer peripheral straight surface 22c and an engagement groove 66 are formed in an outer peripheral surface of the second piston 22 in order from the pressure fluid chamber 46 side toward the spring chamber 44 side. A first pressing portion 48 is provided in the first piston 20 so as to press the engagement members 50 toward the pressure fluid chamber 46 side. A second pressing portion 68 is provided in a peripheral wall of the pressure fluid chamber 46 so as to receive the engagement members 50 that are in a state of being in contact with the outer peripheral straight surface 22c, the second pressing portion 68 engages the engagement members 50 with the engagement groove 66 when the second piston 22 advances toward the pressure fluid chamber 46 side. An inner peripheral straight surface 33 is provided in the peripheral wall of the pressure fluid chamber 46 so as to come into contact with the engagement members 50 that are in a state of being engaged with the engagement groove 66.

In this case, an advantageous effect is exerted that it is possible to simply configure the switching mechanism.

In addition, in the present invention, it is preferred to add the following configuration.

Specifically, the engagement members are composed of engagement balls 50, and a first contact surface 70 is formed in the first pressing portion 48 and comes into contact with each engagement ball 50 from the spring chamber 44 side. A second contact surface 72 is formed in the second pressing portion 68 and comes into contact with each engagement ball 50 from the pressure fluid chamber 46 side. An intersection angle θ of the first contact surface 70 and the second contact surface 72 is opened toward the second piston 22 and is set within a range of 10 degrees to 25 degrees.

In this case, it is possible to set a force of moving each engagement ball in the direction toward the second piston 22, within a predetermined small range. As a result, it is possible to achieve both: ensuring an operation force required when each engagement ball is fitted into the engagement groove; and decreasing a force applied from each engagement ball to the outer peripheral straight surface of the second piston to smoothly advance the second piston.

Figure 4:
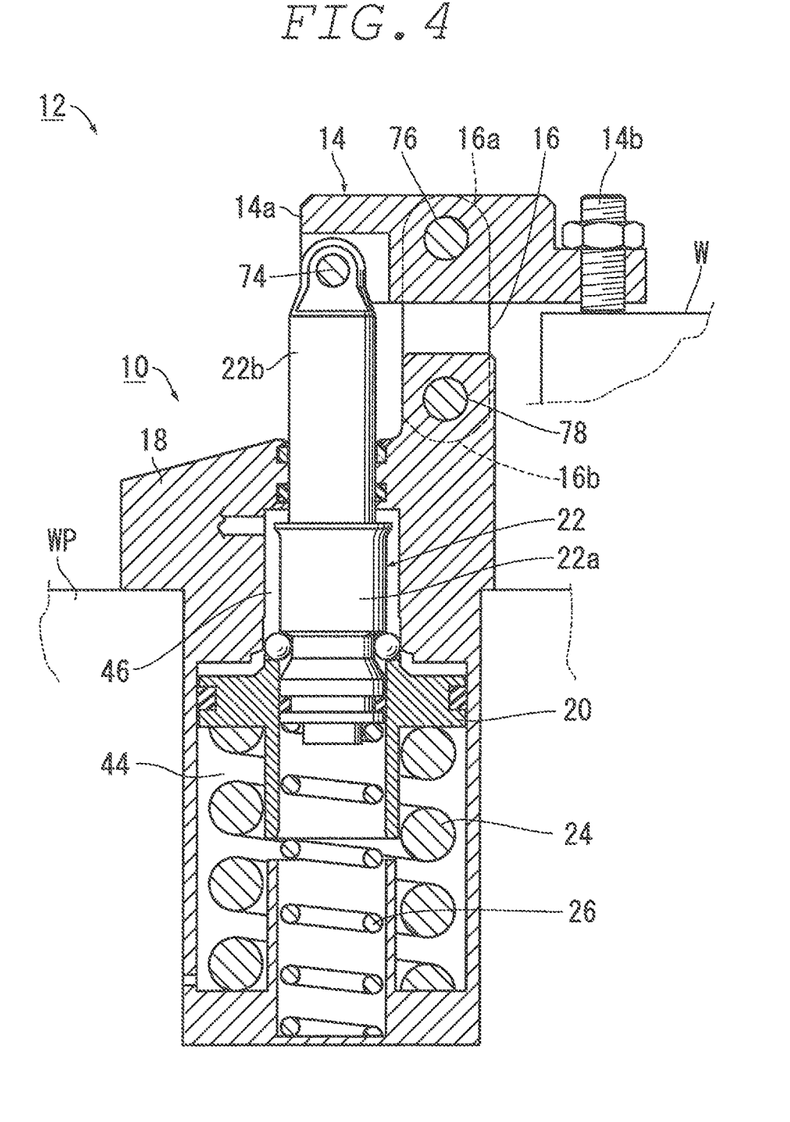
FIG. 4 illustrates a clamp device using the actuator and is a cross-sectional elevation view of the clamp device in a clamping state.

A clamp device 12 using the actuator 10 is configured as follows, for example, as shown in FIG. 4.

Specifically, the output portion 22b projects in a direction toward the pressure fluid chamber 46. A base portion of a clamp arm 14 in a longitudinal direction thereof is supported by the leading end portion of the output portion 22b so as to be swingable in a plane including the axis CL (see FIG. 1). It is conceivable that one end portion 16a of a link member 16 is rotatably supported by a middle portion of the clamp arm 14 in the longitudinal direction thereof, and another end portion 16b of the link member 16 is rotatably supported by the housing 18.

Furthermore, another clamp device 12 using the actuator 10 is configured as follows, for example, as shown in FIGS. 5A to 5D.

Specifically, the output portion 22b may project in a direction toward the spring chamber 44, and a clamp arm 14 may be fixed to the leading end portion of the output portion 22b.

DETAILED DESCRIPTION OF EMBODIMENTS

FIGS. 1 to 4 illustrate a first embodiment of the present invention. First, the structure of an actuator according to the present invention will be described with reference to FIG. 1.

Figure 1:
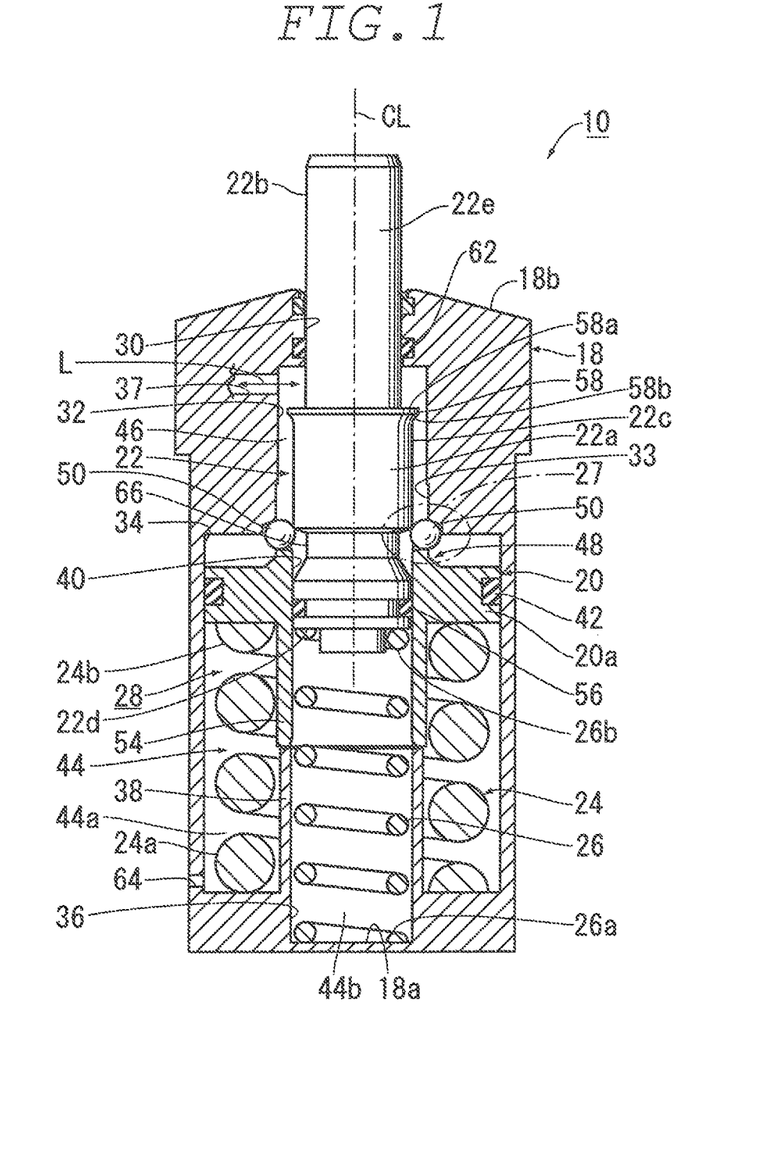
FIG. 1 illustrates a first embodiment of the present invention and is a cross-sectional elevation view of an actuator.

An actuator 10 includes a housing 18, and the housing 18 is fixed to a fixed-side member such as a work pallet by a plurality of bolts (the member and the bolts are not shown). A cylinder hole 28 is formed within the housing 18 so as to extend in an up-down direction (the direction of an axis CL). The cylinder hole 28 is composed of a large-diameter first hole 34, an intermediate-diameter second hole 32, and a small-diameter third hole 30 which are formed in order from below.

A piston body 20a of a first piston 20 for high load is inserted into the first hole 34 via a packing 42 so as to be movable in the up-down direction, and a rod member 54 projects downward from the piston body 20a so as to be integrated with the piston body 20a. A cylindrical hole 40 extends through the first piston 20 in the up-down direction. In addition, an annular stopper 38 projects upward from a center portion of a lower wall 18a of the housing 18 and is opposed to the rod member 54 from below.

A large-diameter portion 22a of a second piston 22 for low load is inserted into the cylindrical hole 40 of the first piston 20 via a packing 56 so as to be movable in the up-down direction. A small-diameter portion 22e projects upward from the large-diameter portion 22a so as to be integrated with the large-diameter portion 22a. A packing 62 is mounted between the small-diameter portion 22e and the third hole 30. An output portion 22b is provided at an upper end portion (leading end portion) of the small-diameter portion 22e and projects to above an upper wall 18b of the housing 18.

The internal space of the cylinder hole 28 is partitioned into two upper and lower chambers by the first piston 20 and the second piston 22. The upper chamber is formed as a pressure fluid chamber 46, and the lower chamber is formed as a spring chamber 44.

The pressure fluid chamber 46 is composed of an upper portion of the first hole 34 and the second hole 32. A pressure oil L as a pressure fluid can be supplied and discharged through a supply/discharge port 37 opened in an upper portion of the second hole 32.

The spring chamber 44 includes a first spring chamber 44a formed annularly below the piston body 20a of the first piston 20; and a second spring chamber 44b formed over a cylindrical hole 36 of the annular stopper 38 and the cylindrical hole 40 of the first piston 20.

A first spring 24, for high load, composed of a compression coil spring is mounted in the first spring chamber 44a. A lower end 24a of the first spring 24 is received by the lower wall 18a of the housing 18, and an upper end 24b of the first spring 24 is received by the piston body 20a. In addition, a second spring 26, for low load, composed of a compression coil spring is mounted in the second spring chamber 44b. A lower end 26a of the second spring 26 is received by the lower wall 18a of the housing 18, and an upper end 26b of the second spring 26 is received by a lower portion 22d of the second piston 22.

Due to the above configuration, the respective lower ends 24a and 26a of the first spring 24 and the second spring 26 are received by the lower wall 18a as a wall surface of the spring chamber 44, and the upper ends 24b and 26b urge upward the first piston 20 and the second piston 22, respectively. The urging force of the first spring 24 is set at a value greater than that of the urging force of the second spring 26.

It should be noted that a ventilation hole 64 communicates with a lower portion of the first spring chamber 44a.

The first piston 20 is connected selectively to the housing 18 or the second piston 22 by a switching mechanism 27 disposed in the pressure fluid chamber 46. The switching mechanism 27 is configured as follows as shown in FIG. 1 (and FIGS. 3A to 3D).

A plurality of engagement balls 50 made of steel are arranged along an outer periphery of the large-diameter portion 22a of the second piston 22 so as to be spaced apart from each other at predetermined intervals in a circumferential direction. An outer peripheral straight surface 22c and an engagement groove 66 are provided in an outer peripheral surface of the large-diameter portion 22a in order from above. A flange portion 58 projects from an upper portion of the outer peripheral straight surface 22c outward in a radial direction. In the flange portion 58, reference numeral 58a denotes an upper end surface, and reference numeral 58b denotes an outer peripheral surface having an arc shape.

In addition, an annular first pressing portion 48 projects upward from an upper portion of the first piston 20 and is configured to press the engagement balls 50 upward. More specifically, U-shaped grooves 49 are formed in an upper portion of the first pressing portion 48 so as to extend in the radial direction and be spaced apart from each other at predetermined intervals in the circumferential direction, and first contact surfaces 70 are formed of bottom surfaces of the grooves 49. The first contact surfaces 70 are in contact with the engagement balls 50 from below (the spring chamber 44 side). It should be noted that in this embodiment, whereas outer side portions of the first contact surfaces 70 are formed so as to extend horizontally, inclined surfaces 70a are provided at inner side portions of the first contact surfaces 70 so as to be inclined downward (see FIG. 3D).

Furthermore, a second pressing portion 68 and an inner peripheral straight surface 33 are provided in a peripheral wall of the second hole 32 as a peripheral wall of the pressure fluid chamber 46 in order to above.

The second pressing portion 68 has a second contact surface 72 inclined so as to get close to the second piston 22 as it goes upward; and a retaining surface 73 formed so as to extend substantially vertically. The second contact surface 72 is brought into contact with the engagement balls 50 from above (the pressure fluid chamber 46 side). In addition, the retaining surface 73 blocks the engagement balls 50 from falling off outward in the radial direction.

When the second piston 22 is moved downward (see FIG. 3A), the second pressing portion 68 receives therein the engagement balls 50 that are in a state of being in contact with the outer peripheral straight surface 22c. In addition, the second pressing portion 68 is configured to press the engagement balls 50 inward in the radial direction (i.e., toward the second piston 22) to engage the engagement balls 50 with the engagement groove 66, when the second piston 22 is moved upward (see FIGS. 3B and 3C). A tapered surface 66a is formed in an upper wall of the engagement groove 66 so as to be tapered downward. It should be noted that in this embodiment, the inclined surface 70a of each first contact surface 70 is formed so as to be inclined in substantially the same direction as the tapered surface 66a, but is not limited to this structure.

Figure 3A:
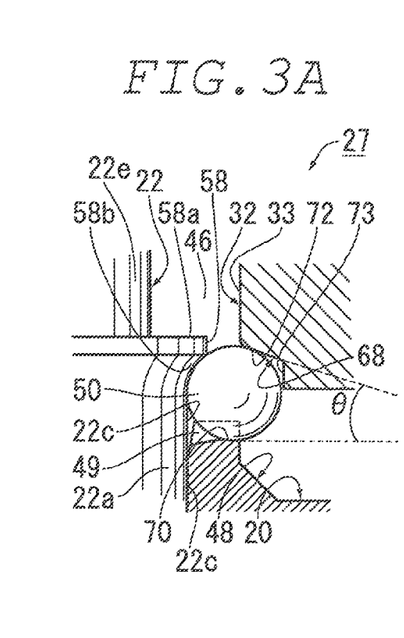
FIGS. 3A to 3D are enlarged views of principal parts in FIGS. 2A to 2D, respectively, and are operation explanatory diagrams of a switching mechanism provided in the actuator.
Figure 3B:
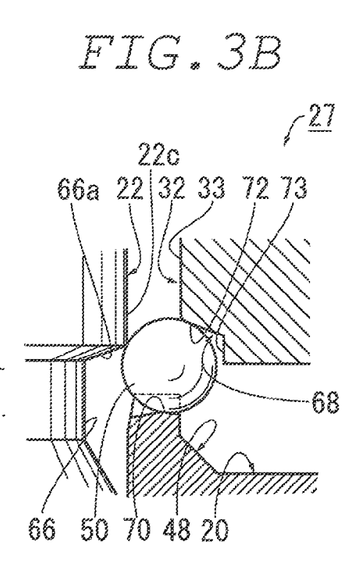
Figure 3C:
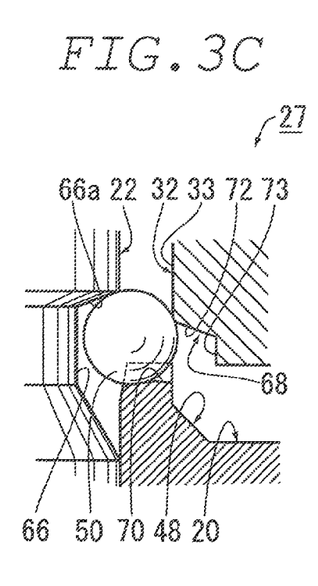
Figure 3D:
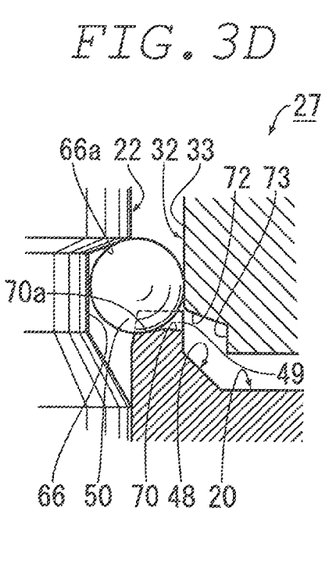

The inner peripheral straight surface 33 is configured to come into contact with the engagement balls 50 that are in a state of being engaged with the engagement groove 66 (see FIG. 3D).

The actuator 10 having the above configuration operates as follows as shown in FIGS. 2A to 2D (and FIGS. 3A to 3D). It should be noted that FIGS. 3A to 3D are enlarged views of principal parts of FIGS. 2A to 2D.

Figure 2A:
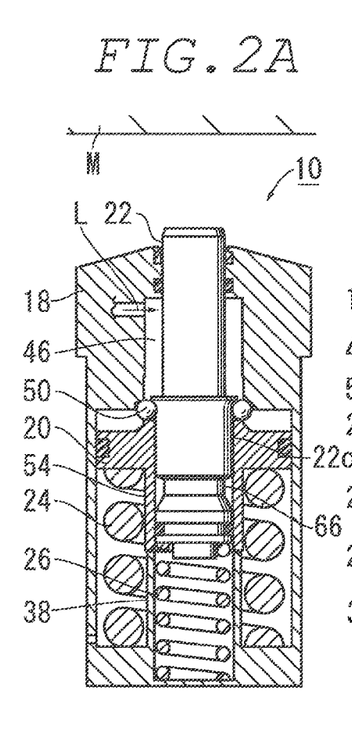
FIGS. 2A to 2D are operation explanatory diagrams of the actuator.

In a non-operating state in FIG. 2A (and FIG. 3A), the pressure oil L is supplied into the pressure fluid chamber 46 of the actuator 10. By the pressure of the pressure oil L, the second piston 22 is moved downward against the second spring 26 and the first piston 20 is moved downward against the first spring 24, and the rod member 54 of the first piston 20 is received by the annular stopper 38. In this state, a to-be-pressed member M is transported to above the actuator 10.

In the non-operating state, as shown in FIG. 3A, each engagement ball 50 is retainable by the first contact surface 70, the second contact surface 72, and an outer peripheral surface 58b of the flange portion 58. Thus, the first piston 20 is connectable to the housing 18 via the engagement balls 50, and the first piston 20 can be blocked from moving upward (toward the pressure fluid chamber 46 side).

Figure 2B:
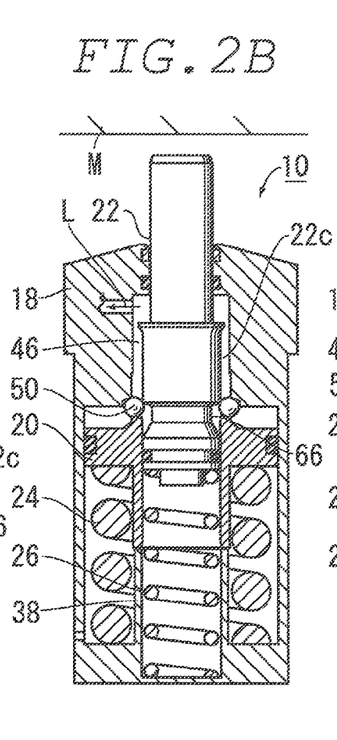
Figure 2C:
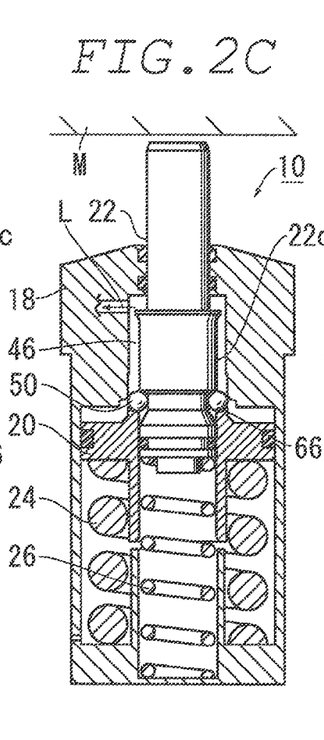
Figure 2D:
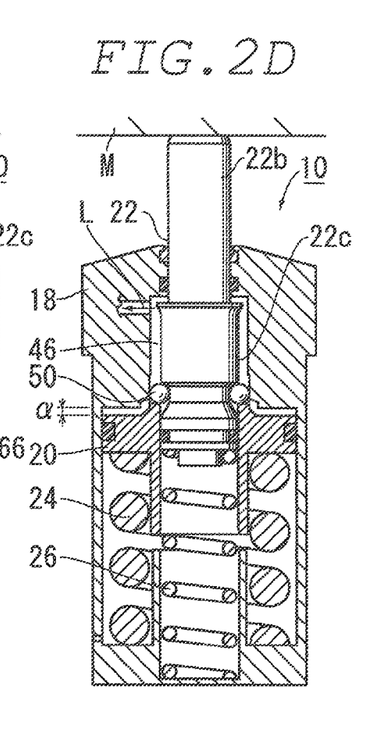

When switching from the non-operating state in FIG. 2A to an operating state in FIG. 2D, the pressure oil L in the pressure fluid chamber 46 is discharged to the outside in the state in FIG. 2A. By so doing, the urging force of the second spring 26 moves the second piston 22 upward with a low load relative to the first piston 20 that is blocked from moving upward by the engagement balls 50.

More specifically, the urging force of the first spring 24 is applied from the first contact surfaces 70 of the first piston 20 via the engagement balls 50 to the second contact surface 72. Thus, a reaction force is applied from the second contact surface 72 to the engagement balls 50, a component force, in the radial direction, of the reaction force presses the engagement balls 50 against the outer peripheral straight surface 22c of the second piston 22, and thus the pressing force becomes a sliding resistance of the second piston 22. Furthermore, a sliding resistance is applied also from the packings 56 and 62 to the second piston 22. Therefore, the second spring 26 moves the second piston 22 upward against the relatively small sliding resistance with a low load.

Then, in a final stage of low-load upward movement shown in FIG. 2B (and FIG. 3B), the engagement balls 50 come into a state immediately before start of engagement with the engagement groove 66.

Next, as shown in an initial stage of high-load upward movement in FIG. 2C (and FIG. 3C), when the second piston 22 is moved upward by a predetermined stroke, the reaction force applied from the second contact surface 72 to the engagement balls 50 starts the engagement balls 50 coming into contact with the tapered surface 66a of the engagement groove 66. By so doing, the first piston 20 is connected to the second piston 22, the connection between the first piston 20 and the housing 18 is released (see FIG. 3D), and the urging force of the first spring 24 starts strongly moving upward the second piston 22 via the first piston 20 and the engagement balls 50. In this case, the urging force of the second spring 26 is also continuously applied to the second piston 22, and thus the second piston 22 is further strongly moved upward.

Subsequently, as shown in the operating state in FIG. 2D (and FIG. 3D), the first piston 20 and the second piston 22 are slightly moved upward, the output portion 22b comes into contact with the to-be-pressed member M, and the resultant of the urging force of the first spring 24 and the urging force of the second spring 26 strongly presses the to-be-pressed member M.

It should be noted that in the state in FIG. 2D, an allowance stroke α is left at the upper side of the first piston 20.

When switching from the operating state in FIG. 2D (and FIG. 3D) to the non-operating state in FIG. 2A (and FIG. 3A), the pressure oil L is supplied into the pressure fluid chamber 46 in the state in FIG. 2D. By so doing, the pressure of the pressure oil L moves the first piston 20 and the second piston 22 downward against the first spring 24 and the second spring 26.

Thus, as shown in FIG. 2C (and FIG. 3C), the tapered surface 66a of the engagement groove 66 starts pressing the engagement balls 50 outward in the radial direction. Subsequently, as shown in FIG. 2B (and FIG. 3B), the downward movement of the first piston 20 is blocked by the annular stopper 38. Almost simultaneously with this, an upper portion of the tapered surface 66a smoothly pushes out the engagement balls 50 into the second pressing portion 68. Thus, the first piston 20 and the second pressing portion 68 of the housing 18 are connected to each other, and the state of connection between the first piston 20 and the second piston 22 is released. Thereafter, as shown in FIG. 2A (and FIG. 3A), the second piston 22 is further moved downward relative to the first piston 20 that is blocked from moving downward. At that time, the flange portion 58 of the second piston 22 comes into contact with the engagement balls 50 from above, whereby the downward movement of the second piston 22 is blocked.

In the actuator 10 having the above configuration, the engagement balls 50 and the like as components of the switching mechanism 27 are disposed in the pressure fluid chamber 46, and thus it is possible to sufficiently lubricate the engagement balls 50 and the like by the pressure oil L supplied into the pressure fluid chamber 46. Thus, it is possible to smoothly use the switching mechanism 27 over a long period of time, and maintenance thereof is not troublesome.

It should be noted that as shown in FIG. 3A, an intersection angle θ of each first contact surface 70 and the second contact surface 72 is opened inward in the radial direction of the cylinder hole 28 (i.e., toward the second piston 22), and is preferably set within a range of 10 degrees to 25 degrees. The reason is as follows.

If the intersection angle θ is lower than 10 degrees, the component force, in the radial direction, of the reaction force applied from the second contact surface 72 to the engagement balls 50 is excessively decreased. Thus, a force by which the second contact surface 72 presses the engagement balls 50 into the engagement groove 66 is excessively decreased, and there is a concern that the engagement balls 50 are not smoothly engaged with the engagement groove 66. In addition, if the intersection angle θ is higher than 25 degrees, the component force in the radial direction is excessively increased. Thus, a force by which the second contact surface 72 presses the engagement balls 50 against the outer peripheral straight surface 22c of the second piston 22 is excessively increased, and there is a concern that the second piston 22 is not smoothly moved upward and downward. Therefore, the intersection angle θ is preferably within the range of 10 degrees to 25 degrees.

FIG. 4 shows a link-type clamp device 12 using the actuator 10. The clamp device 12 is configured as described below.

The housing 18 of the actuator 10 is fixed to a work pallet WP. The output portion 22b provided at an upper portion of the second piston 22 projects to above the housing 18 (in the direction toward the pressure fluid chamber 46).

A left portion (base portion) 14a of a clamp arm 14 in a longitudinal direction thereof is supported by the upper end portion (leading end portion) of the output portion 22b via a connecting pin 74 so as to be swingable in the up-down direction in a plane including the axis CL (see FIG. 1). An upper end portion (one end portion) 16a of a link member 16 is rotatably supported by a middle portion of the clamp arm 14 in the longitudinal direction thereof via an upper pin 76, and a lower end portion (the other end portion) 16b of the link member 16 is rotatably supported by an upper portion of the housing 18 via a lower pin 78.

In an operating state (clamping state) in FIG. 4, the pressure oil L in the pressure fluid chamber 46 is discharged, and the resultant of the urging force of the first spring 24 and the urging force of the second spring 26 moves the second piston 22 upward. Thus, the clamp arm 14 is strongly swung clockwise, and a pressing bolt 14b provided at a right portion of the clamp arm 14 strongly presses a workpiece W against an upper surface of the work pallet WP.

FIGS. 5A to 5D illustrate a second embodiment of the present invention and are diagrams similar to FIGS. 2A to 2D, respectively. In the second embodiment, a rotation type clamp device 12 using the actuator 10 is illustrated, and components which are the same as the components (or similar to the components) in the above first embodiment are designated at the same reference numerals in principle, and are described.

Figure 5A:
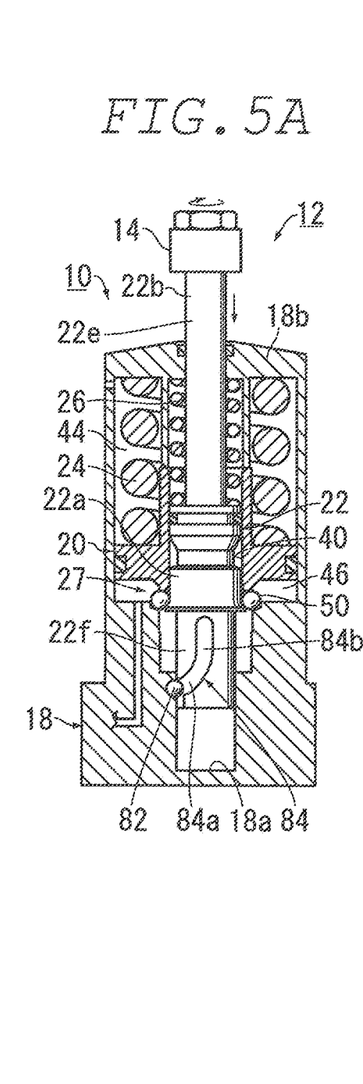
FIGS. 5A to 5D illustrate a second embodiment of the present invention and are diagrams similar to FIGS. 2A to 2D.

As shown in FIG. 5A, the output portion 22b projects from the large-diameter portion 22a of the second piston 22 in the direction toward the spring chamber 44. More specifically, in the second embodiment, the first piston 20, the second piston 22, the spring chamber 44, the pressure fluid chamber 46, and the switching mechanism 27 are arranged upside down as compared to the first embodiment, the small-diameter portion 22e projects upward from the large-diameter portion 22a of the second piston 22, and the output portion 22b is provided at the upper end portion (leading end portion) of the small-diameter portion 22e. The left end portion (see FIG. 5B) of the clamp arm 14 is fixed to the output portion 22b.

In addition, as shown in FIG. 5A, a rod 22f projects downward from the large-diameter portion 22a so as to be integrated with the large-diameter portion 22a, and is fitted into the lower wall 18a of the housing 18. Moreover, a guide groove 84 is formed in the rod 22f. The guide groove 84 includes a spiral groove 84a and a straight groove 84b which are provided so as to extend upward and be connected to each other. Furthermore, a guide ball 82 is supported by the lower wall 18a and fitted into the guide groove 84. The guide ball 82 and the spiral groove 84a constitute a rotation mechanism.

The above rotation type clamp device 12 operates as follows.

In a non-operating state (unclamping state) in FIG. 5A, the second piston 22 and the first piston 20 are moved upward by the pressure oil L supplied into the pressure fluid chamber 46. The first piston 20 is receivable by the housing 18 via the engagement balls 50, and can be blocked from moving downward.

Figure 5B:
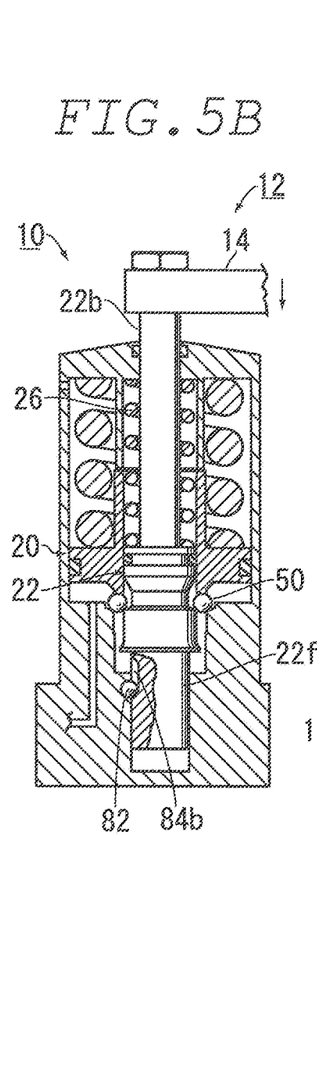
Figure 5C:
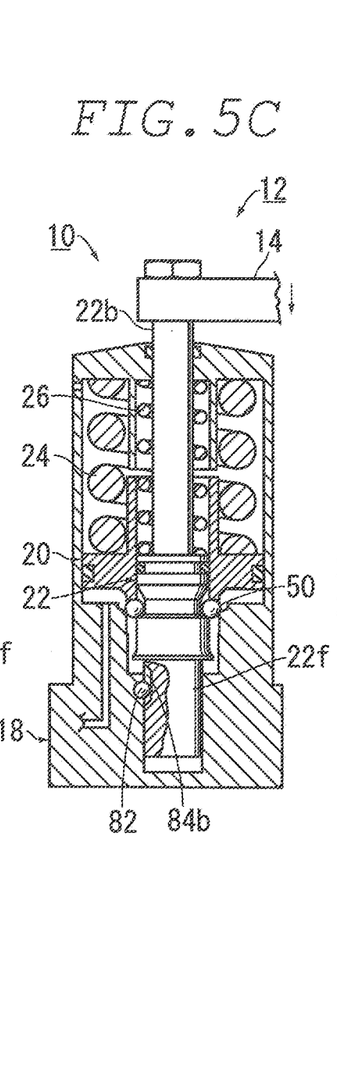
Figure 5D:
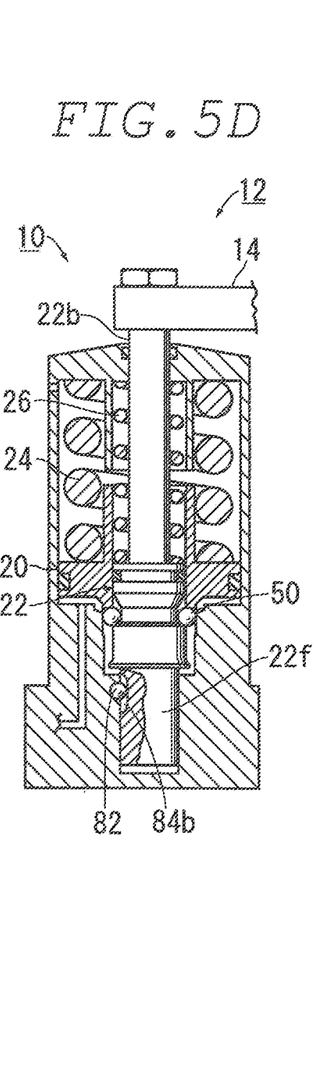

When switching from the non-operating state (unclamping state) in FIG. 5A to an operating state (clamping state) in FIG. 5D, the pressure oil L in the pressure fluid chamber 46 is discharged in the state in FIG. 5A. By so doing, the second spring 26 moves the second piston 22 downward relative to the first piston 20 that is blocked from moving downward by the engagement balls 50.

Thus, the rod 22f formed in the second piston 22 is moved downward relative to the guide ball 82, and the guide ball 82 moves the second piston 22 (and the clamp arm 14) downward via the spiral groove 84a while rotating the second piston 22 (and the clamp arm 14) clockwise in a plan view (see FIGS. 5A and 5B).

Next, as shown in FIG. 5C, when the second piston 22 is moved downward by a predetermined stroke, the first piston 20 is connected to the second piston 22 and the connection between the first piston 20 and the housing 18 is released by the engagement balls 50, and the urging force by the first spring 24 starts strongly moving the second piston 22 downward along the straight groove 84b via the first piston 20 and the engagement balls 50. In this case, the urging force by the second spring 26 is also applied to the second piston 22, and thus the second piston 22 is further strongly moved downward.

Subsequently, as shown in the operating state (clamping state) in FIG. 5D, the first piston 20 and the second piston 22 are slightly moved downward, the right portion of the clamp arm 14 comes into contact with an upper surface of a workpiece (not shown), and the resultant of the urging force of the first spring 24 and the urging force of the second spring 26 strongly presses the workpiece.

It should be noted that switching from the operating state (clamping state) in FIG. 5D to the non-operating state (unclamping state)) in FIG. 5A is performed in a manner substantially reverse to the above.

In the second embodiment described above, the rotation mechanism (the spiral groove 84a of the guide groove 84 and the guide ball 82) may be omitted, and the clamp arm 14 may be moved only in the up-down direction. In this case, it is also possible to omit the straight groove 84b.

Each embodiment described above can be changed as follows.

The engagement members 50 may be spherical surface rollers or the like instead of the illustrated balls.

The pressure fluid L may be another liquid, or may be a gas such as compressed air, instead of the illustrated pressure oil.

The installed attitude of the actuator 10 (and the clamp device 12) may be an attitude which is upside down as compared to the illustrated attitude, or the actuator 10 (and the clamp device 12) may be installed so as to extend horizontally or in an oblique direction.

The ventilation hole 64 in FIG. 1 may be changed to a supply/discharge port for the pressure fluid L. In this case, in moving the first piston 20 and the second piston 22 upward, it is possible to further strongly drive the two pistons 20 and 22 by supplying the pressure fluid L into the spring chamber 44.

As a matter of course, various other changes conceivable by those skilled in the art can be made.

The invention claimed is:

1. An actuator comprising:
a first piston, for high load, inserted into a housing so as to be movable in a direction of an axis;
a second piston, for low load, movably inserted into a cylindrical hole extending through the first piston in the direction of the axis, the second piston having, at a leading end portion thereof, an output portion projecting to an outside of the housing;
a pressure fluid chamber and a spring chamber formed by partitioning an inside of the housing by the first piston and the second piston;
a first spring, for high load, mounted in the spring chamber so as to urge the first piston toward the pressure fluid chamber side and received by a wall surface of the spring chamber;
a second spring, for low load, mounted in the spring chamber so as to urge the second piston toward the pressure fluid chamber side, the second spring having a lower end received by a lower wall of the housing; and
a switching mechanism having a plurality of engagement members arranged along an outer periphery of the second piston so as to be spaced apart from each other at predetermined intervals in a circumferential direction, the switching mechanism being disposed in the pressure fluid chamber so as to connect the first piston selectively to the housing or the second piston via the engagement members, wherein
the switching mechanism includes:
an outer peripheral straight surface and an engagement groove provided in an outer peripheral surface of the second piston in order from the pressure fluid chamber side toward the spring chamber side;
a first pressing portion provided in the first piston so as to press the engagement members toward the pressure fluid chamber side;
a second pressing portion provided in a peripheral wall of the pressure fluid chamber so as to receive therein the engagement members that are in a state of being in contact with the outer peripheral straight surface, the second pressing portion engaging the engagement members with the engagement groove when the second piston advances toward the pressure fluid chamber side; and
an inner peripheral straight surface provided in the peripheral wall of the pressure fluid chamber so as to come into contact with the engagement members that are in a state of being engaged with the engagement groove, and
the switching mechanism is configured such that the first piston is connected to the second piston via the engagement members and the connection between the first piston and the housing is releasable to allow the first piston to move in the direction of the axis relative to the housing when the second spring advances the second piston toward the pressure fluid chamber side by a predetermined stroke in a state where the first piston is connected so as to be received by the housing via the engagement members, during an actuator operating period when a pressure fluid in the pressure fluid chamber is discharged.

2. The actuator according to claim 1, wherein
the engagement members are composed of engagement balls,
the first pressing portion has a first contact surface which comes into contact with each engagement ball from the spring chamber side,
the second pressing portion has a second contact surface which comes into contact with each engagement ball from the pressure fluid chamber side, and
an intersection angle of the first contact surface and the second contact surface is opened toward the second piston and is set within a range of 10 degrees to 25 degrees.

3. A clamp device using the actuator according to claim 2, wherein the output portion projects in a direction toward the pressure fluid chamber,
a base portion of a clamp arm in a longitudinal direction thereof is supported by the leading end portion of the output portion so as to be swingable in a plane including the axis, and one end portion of a link member is rotatably supported by a middle portion of the clamp arm in the longitudinal direction thereof, and another end portion of the link member is rotatably supported by the housing.

4. A clamp device using the actuator according to claim 2, wherein the output portion projects in a direction toward the spring chamber, and a clamp arm is fixed to the leading end portion of the output portion.

5. A clamp device using the actuator according to claim 1, wherein the output portion projects in a direction toward the pressure fluid chamber, a base portion of a clamp arm in a longitudinal direction thereof is supported by the leading end portion of the output portion so as to be swingable in a plane including the axis, and one end portion of a link member is rotatably supported by a middle portion of the clamp arm in the longitudinal direction thereof, and another end portion of the link member is rotatably supported by the housing.

6. A clamp device using the actuator according to claim 1, wherein the output portion projects in a direction toward the spring chamber, and a clamp arm is fixed to the leading end portion of the output portion.

7. An actuator comprising:

a first piston, for high load, inserted into a housing so as to be movable in a direction of an axis;

a second piston, for low load, movably inserted into a cylindrical hole extending through the first piston in the direction of the axis, the second piston having, at a leading end portion thereof, an output portion projecting to an outside of the housing;

a pressure fluid chamber and a spring chamber formed by partitioning an inside of the housing by the first piston and the second piston;

a first spring, for high load, mounted in the spring chamber so as to urge the first piston toward the pressure fluid chamber side and received by a wall surface of the spring chamber;

a second spring, for low load, mounted in the spring chamber so as to urge the second piston toward the pressure fluid chamber side, the second spring having a lower end received by a lower wall of the housing; and a switching mechanism having a plurality of engagement balls arranged along an outer periphery of the second piston so as to be spaced apart from each other at predetermined intervals in a circumferential direction, the switching mechanism being disposed in the pressure fluid chamber so as to connect the first piston selectively to the housing or the second piston via the engagement balls, wherein the switching mechanism includes:

an outer peripheral straight surface and an engagement groove provided in an outer peripheral surface of the second piston in order from the pressure fluid chamber side toward the spring chamber side;

a first pressing portion provided in the first piston so as to press the engagement balls toward the pressure fluid chamber side;

a second pressing portion provided in a peripheral wall of the pressure fluid chamber so as to receive therein the engagement balls that are in a state of being in contact with the outer peripheral straight surface, the second pressing portion engaging the engagement balls with the engagement groove when the second piston advances toward the pressure fluid chamber side;

an inner peripheral straight surface provided in the peripheral wall of the pressure fluid chamber so as to come into contact with the engagement balls that are in a state of being engaged with the engagement groove; and U-shaped grooves are formed in an upper portion of the first pressing portion so as to extend in a radial direction and be spaced apart from each other at predetermined intervals in the circumferential direction, and first contact surfaces that are in contact with the engagement balls from the spring chamber side are formed of bottom surfaces of the grooves, and the switching mechanism is configured such that the first piston is connected to the second piston via the engagement balls and the connection between the first piston and the housing is releasable to allow the first piston to move in the direction of the axis relative to the housing when the second spring advances the second piston toward the pressure fluid chamber side by a predetermined stroke in a state where the first piston is connected so as to be received by the housing via the engagement balls, during an actuator operating period when a pressure fluid in the pressure fluid chamber is discharged.

* * * * *